US009443032B2

(12) United States Patent
Park et al.

(10) Patent No.: US 9,443,032 B2
(45) Date of Patent: Sep. 13, 2016

(54) METHOD FOR DETERMINING A DEVICE TO PROVIDE WITH CONTENT BASED ON CONTENT ATTRIBUTE AND ELECTRONIC DEVICE USING THE SAME

(75) Inventors: Soo-hong Park, Yongin-si (KR); Jin-guk Jeong, Yongin-si (KR); Hyung-rae Cho, Seoul (KR); Sun-ae Kim, Seoul (KR); Ji-young Kwahk, Seongnam-si (KR); Hyun-joo Oh, Seoul (KR)

(73) Assignee: Samsung Electronics Co., Ltd (KR)

( * ) Notice: Subject to any disclaimer, the term of this patent is extended or adjusted under 35 U.S.C. 154(b) by 552 days.

(21) Appl. No.: 12/939,718

(22) Filed: Nov. 4, 2010

(65) Prior Publication Data
US 2011/0106917 A1 May 5, 2011

(30) Foreign Application Priority Data
Nov. 4, 2009 (KR) ........................ 10-2009-0105755

(51) Int. Cl.
G06F 15/16 (2006.01)
H04W 24/00 (2009.01)
G06F 17/30 (2006.01)
H04W 24/02 (2009.01)
H04L 12/26 (2006.01)

(52) U.S. Cl.
CPC ......... *G06F 17/30905* (2013.01); *H04L 43/08* (2013.01); *H04W 24/02* (2013.01)

(58) Field of Classification Search
CPC ... H04W 80/04; H04W 72/04; H04W 84/12; G06F 17/30905
USPC ........ 709/202, 203, 219; 370/329, 328, 338, 370/368; 713/153, 168, 170, 171; 380/273, 380/277; 726/4
See application file for complete search history.

(56) References Cited

U.S. PATENT DOCUMENTS

| 6,791,904 | B1* | 9/2004 | Herron ................ H04L 12/2803 368/13 |
| 7,783,975 | B2 | 8/2010 | Rhim et al. |
| 7,836,507 | B2 | 11/2010 | Ono et al. |
| 9,003,050 | B2* | 4/2015 | Karlsson ............... H04L 65/608 709/219 |
| 2004/0172476 | A1* | 9/2004 | Chapweske ............ H04L 29/06 709/231 |
| 2005/0210290 | A1 | 9/2005 | Ono et al. |
| 2006/0036671 | A1 | 2/2006 | Rhim et al. |
| 2006/0159109 | A1* | 7/2006 | Lamkin et al. ............... 370/401 |

(Continued)

FOREIGN PATENT DOCUMENTS

EP 2 111 008 10/2009
KR 1020050093652 9/2005

(Continued)

OTHER PUBLICATIONS

Korean Office Action dated Sep. 24, 2015 issued in counterpart application No. 10-2009-0105755, 9 pages.
European Search Report dated Jun. 10, 2016 issued in counterpart application No. 10828474.6-1507, 8 pages.
Korean Office Action dated Mar. 25, 2016 issued in counterpart application No. 10-2009-0105755, 10 pages.

*Primary Examiner* — Candal Elpenord
(74) *Attorney, Agent, or Firm* — The Farrell Law Firm, P.C.

(57) ABSTRACT

A method for providing content where one device from among a plurality of devices is determined as a device to transmit the content to, based on the attribute of the requested content. Accordingly, device utilization is optimized by providing the content to the device with the highest priority to play back the content based on the attribute of the content.

13 Claims, 8 Drawing Sheets

(56) References Cited

U.S. PATENT DOCUMENTS

2006/0250994 A1* 11/2006 Sasaki et al. .............. 370/264
2007/0127655 A1*  6/2007 Jung .................. H04M 3/02
                                              379/142.01
2007/0237136 A1* 10/2007 Sako ............. G06F 17/30044
                                                  370/368
2009/0030978 A1   1/2009 Johnson et al.
2009/0150553 A1   6/2009 Collart et al.
2011/0022842 A1   1/2011 Ono et al.

FOREIGN PATENT DOCUMENTS

| KR | 1020050104182 | 11/2005 |
| KR | 1020060015377 | 2/2006 |
| KR | 1020070081363 | 8/2007 |
| KR | 1020090003375 | 1/2009 |
| KR | 1020090013935 | 2/2009 |
| KR | 1020090022613 | 3/2009 |
| WO | WO 2005036813 | 4/2005 |

* cited by examiner

FIG. 3

|  | IP ADDRESS | DIGITAL BOOK (TEXT CONTENT) | MUSIC (AUDIO CONTENT) | IMAGE (VIDEO CONTENT) |
|---|---|---|---|---|
| ELECTRONIC BOOK | 111.111.111 | O |  |  |
| MP3 PLAYER | 111.111.112 |  | O |  |
| MOBILE PHONE | 111.111.113 |  |  |  |
| PVR | 111.111.114 |  |  | O |

FIG. 4

| | IP ADDRESS | DIGITAL BOOK (TEXT CONTENT) | MUSIC (AUDIO CONTENT) | IMAGE (VIDEO CONTENT) |
|---|---|---|---|---|
| ELECTRONIC BOOK | 111.111.111 | (B1),(B2) | A1 | V1 |
| MP3 PLAYER | 111.111.112 | (B3) | (A1),(A2) | V1 |
| MOBILE PHONE | 111.111.113 | B1 | (A3) | V1 ,(V3) |
| PVR | 111.111.114 | B2 | A2 | (V1),(V2) |

FIG. 5

|  | IP ADDRESS | DIGITAL BOOK (TEXT CONTENT) | MUSIC (AUDIO CONTENT) | IMAGE (VIDEO CONTENT) |
|---|---|---|---|---|
| ELECTRONIC BOOK | 111.111.111 | O | | |
| MP3 PLAYER | 111.111.112 | | O | |
| MOBILE PHONE | 111.111.113 | | | MOBILE IMAGE |
| PVR | 111.111.114 | | | HD IMAGE |

FIG. 6

|  | IP ADDRESS | DIGITAL BOOK (TEXT CONTENT) | MUSIC (AUDIO CONTENT) | IMAGE (VIDEO CONTENT) |
|---|---|---|---|---|
| ELECTRONIC BOOK | 111.111.111 | 1 | 3 | 4 |
| MP3 PLAYER | 111.111.112 | 2 | 1 | 3 |
| MOBILE PHONE | 111.111.113 | 3 | 2 | 2 |
| PVR | 111.111.114 | 4 | 4 | 1 |

METHOD FOR DETERMINING A DEVICE TO PROVIDE WITH CONTENT BASED ON CONTENT ATTRIBUTE AND ELECTRONIC DEVICE USING THE SAME

PRIORITY

This application claims priority under 35 U.S.C. §119(a) to Korean Patent Application No. 10-2009-0105755, filed on Nov. 4, 2009, in the Korean Intellectual Property Office, the entire content of which is incorporated herein by reference.

BACKGROUND OF THE INVENTION

1. Field of the Invention

The present invention relates generally to a method for providing content, and more particularly, to a method for providing content of a current device to another device to enable a user of another device to use the content.

2. Description of the Related Art

With the advent of digital devices, users today have a variety of digital devices at disposal. In fact, people are literally living in a digital era.

Digital devices have been providing people with convenience, and through fast-development, particularly in recent years, digital technology has been achieving even higher performance and diversity.

Still, people are looking for more convenient lives, and seeking the answers in digital devices of even higher performances and higher functionalities.

Meanwhile, there is a limit of functions that a single digital device can provide. Accordingly, a method is required, which enables digital devices to operate in convergence to create new functions that the digital device cannot provide alone, and therefore brings in more convenience to the users' lives.

SUMMARY OF THE INVENTION

The present invention has been made to address at least the above problems and/or disadvantages and to provide at least the advantages described below. Accordingly, an aspect of the present invention provides a method for providing a device with content, in which one device from among a plurality of devices owned by a user is selected based on the attributes of the content provided at a specific device, and the content is transmitted to the selected device, so that the devices are enabled to operate in convergence with each other, and with an electronic device using the same.

In one embodiment, a method for providing content includes receiving a request for content, receiving information of an authenticated device which is capable of playing back the requested content, and determining at least one device from among a plurality of devices corresponding to the information of the authenticated device as the device to transmit the content to, based on an attribute of the requested content.

The method according to an embodiment may additionally include transmitting the content to the device which is determined as the device to transmit the content to, and determining one device from among the plurality of devices that has highest priority to play back the content as the device to transmit the content to, based on the attribute of the content. The method according to an embodiment may additionally include transmitting an authentication key to the device requesting the content and to other devices, and the determining is performed if the authentication key, provided at the transmitting, is received from the device requesting the content.

As explained above, the content is provided to a device which is most suitable to play back the content based on the attribute of the content. Accordingly, users are enabled to utilize their devices optimally, and purchase content through not only the device intended to play back the content, but also other devices.

BRIEF DESCRIPTION OF THE DRAWINGS

The above and other aspects, features and advantages of the present invention will be more apparent from the following detailed description when taken in conjunction with the accompanying drawings, in which:

FIG. 3 illustrates a table listing principles for determining a device to transmit content to, in consideration of content type;

FIG. 4 illustrates a table listing principles for determining a device to transmit content to, in consideration of file format of the content;

FIG. 5 illustrates a table listing principles for determining a device to transmit content to, in consideration of a resolution of the content;

FIG. 6 illustrates a table listing principles for determining a device to transmit content to, according to priority order;

DETAILED DESCRIPTION OF EMBODIMENTS OF THE PRESENT INVENTION

Figure 1:
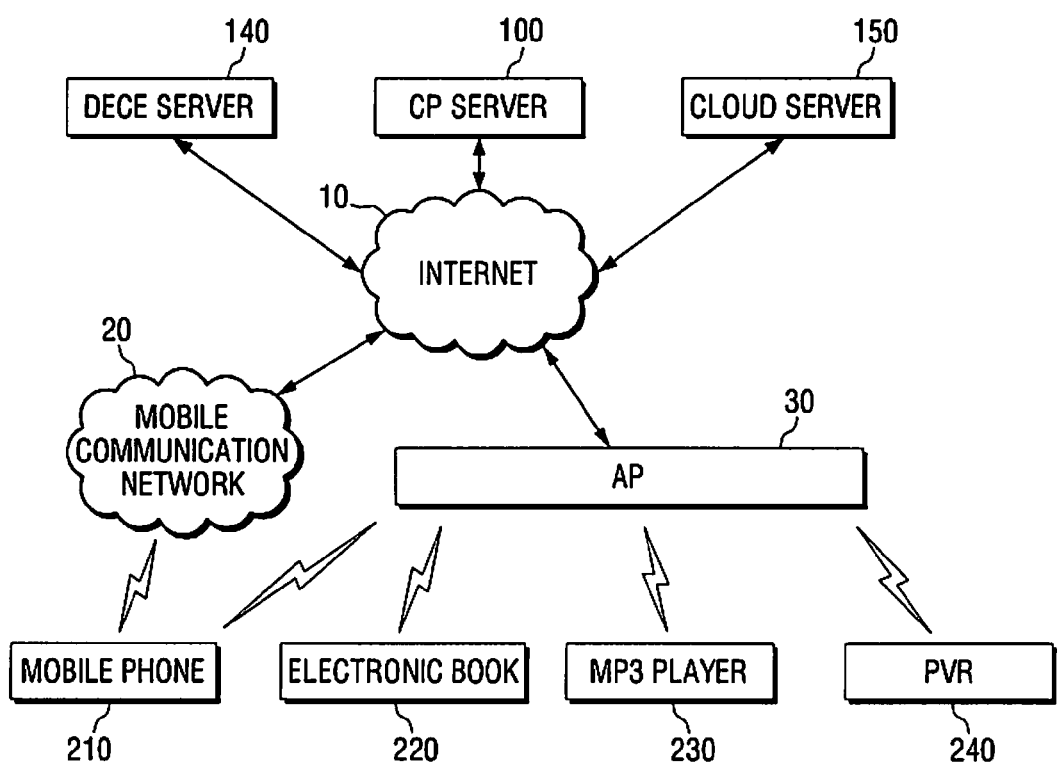
FIG. 1 is a diagram illustrating a network according to an embodiment of the present invention.

Embodiments of the present invention are described in detail with reference to the accompanying drawings.

In the following description, the same or similar reference numerals may be used for the same or similar elements when they are illustrated in different drawings. Detailed descriptions of constructions or processes known in the art may be omitted to avoid obscuring the subject matter of the present invention.

FIG. 1 is illustrates a network according to an embodiment of the present invention. Referring to FIG. 1, the network may include a Content Provider (CP) server 100, a Digital Entertainment Content Ecosystem (DECE) server 140, a cloud server 150, a mobile phone 210, an electronic book 220, an MP3 player 230, and a PVR 240, all of which are communicatively connected to each other.

The DECE server herein refers to a server which manages the contents stored on the CP server, devices to play back the contents provided by the CP server, and user accounts, whereby content is played back irrespective of time, place, or device that plays back the content, with requiring only one time of content downloading. Herein, the DECE server is implemented as a server to transmit information of an authenticated device to play back content requested for purchase for the purpose of example. However, other servers may be implemented to play the role of the DECE server according to an embodiment of the present invention.

The content provided by the CP server 100 may not be downloaded to the device including mobile phone 210, electronic book 220, MP3 player 230, or PVR 240. That is, cloud server 150 may provide the content downloaded from the CP server 100 by accessing the Internet 10 as the user needs the content. The user may set content provided from the cloud server 150 differently, depending on preference, using a cloud browser connected to the cloud server 150.

Specifically, the mobile phone 210, the electronic book 220, the MP3 player 230 and the PVR 240 are communicatively connected to the CP server 100 or the cloud server 150 via the Internet 10 by accessing the AP 30.

Referring to FIG. 1, the mobile phone 210, the electronic book 220, the MP3 player 230 and the PVR 240 are connected wirelessly to the Internet 10 via the AP 30 for the illustrative purpose. However, other examples are also possible. For example, the PVR 240 may be connected to the Internet 10 in a wired manner.

Figure 2:
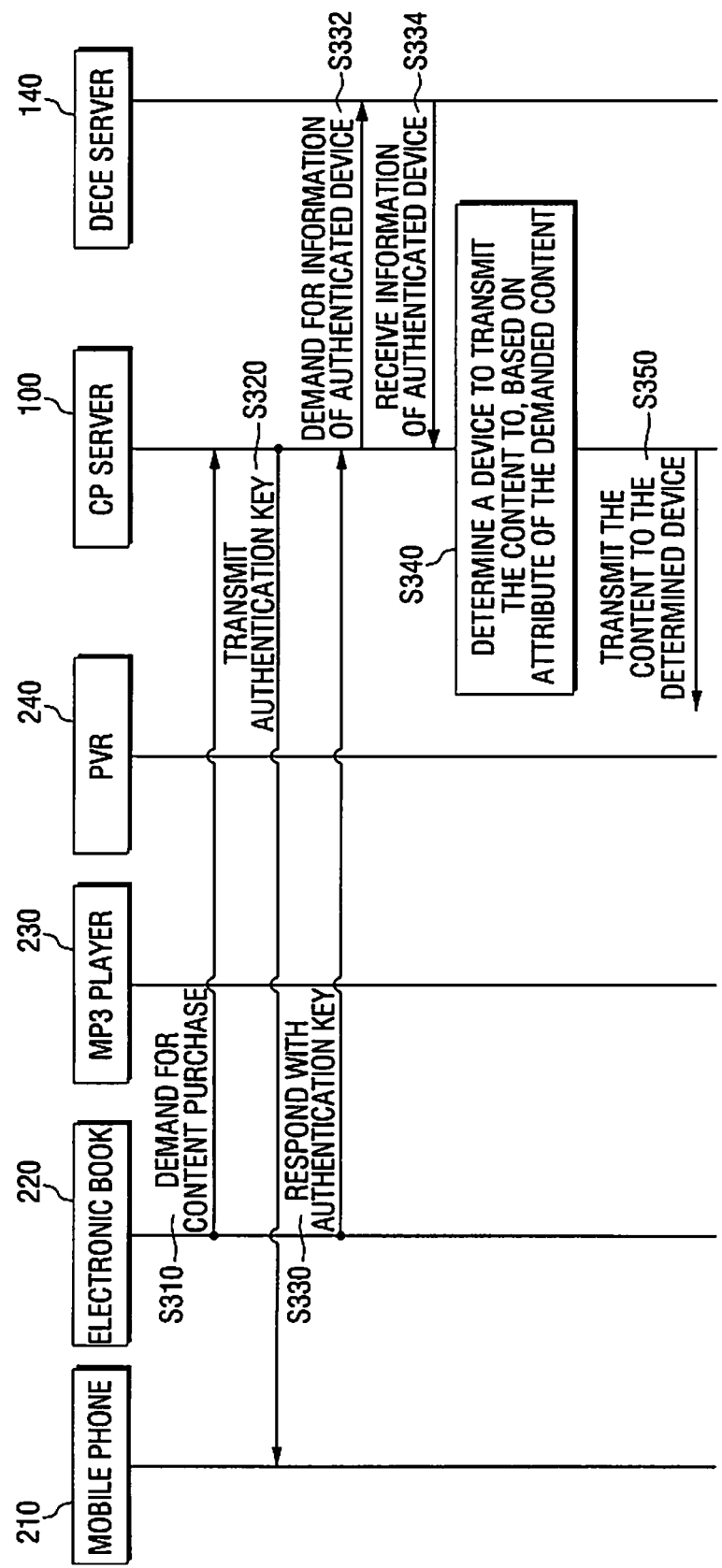
FIG. 2 is a diagram provided to explain a process in which a user purchases content of a Content Provider (CP) server using an electronic book, in the network of FIG. 1.

FIG. 2 is a diagram illustrating a process in which a user purchases the content in the CP server 100 using the electronic book 220 in the network illustrated in FIG. 1.

Referring to FIG. 2, at step S310, the electronic book 220 requests purchase of content to the CP server 100, and at step S320, the CP server 100 generates authentication key and transmit the generated authentication key to the mobile phone 210.

A message indicative of a content purchase request of step S310 is transmitted over the Internet 10. However, the authentication key of step S320 is transmitted as a Short Message Service (SMS) through mobile communication network 20.

The user is required to input the authentication key received at the mobile phone 210 at S320 into the electronic book. At step S330, the electronic book 220 responds with the authentication key inputted by the user to the CP server 100.

Accordingly, authentication by the user of the electronic book 220 is completed. In the embodiment explained above, both the mobile phone 210 and the electronic book 220 are used in the authentication process. Since two devices are used in the authentication process, more secure user authentication can be provided.

After that, at step S332, if the CP server 100 requests the DECE server 140 for information of an authenticated device which is capable of playing back the requested content, and at step S334, the CP server 100 receives the information of the authenticated device which is capable of playing back the requested content from the DECE server 140.

At step S340, the CP server 100 determines a device to transmit the content to, based on the attributes of the content requested for purchase at step S310. At step S350, the CP server 100 transmits the requested content to the selected device which is determined at step S340 as the device to transmit the requested content to at step S340. The content is transmitted at step S350 over the Internet 10.

The principle of determining a device to transmit the content to, based on the attributes of the content requested for purchase at step S310, at step S340 will be explained in greater detail below.

In determining a device to transmit content to, the CP server 100 considers the attributes of the requested content. Specifically, the CP server 100 determines a device to transmit content to if the device has a highest priority order to play back the requested content.

The attributes of the content considered by the CP server 100 may include content type, file format, resolution or volume, and these will be explained in greater detail below.

The content type is one of content attributes, and may be categorized into: i) text; ii) audio; and iii) video. The text content (i) may represent digital books, or text files, the audio content (ii) may represent music file, or audio file, and the video content (iii) may represent still image such as photographs or motion image such as movies.

FIG. 3 lists the principles to consider when determining a device to transmit content to based on the content type. The table of FIG. 3 is stored in the CP server 100 and referred to when step S340 of FIG. 2 is performed. Meanwhile, although only the CP server 100 stores the table of FIG. 3 for illustrative purpose, the DECE server 140, the cloud server 150, or other devices communicatively connected to the CP server 100 or the cloud server 150 may store the table of FIG. 3.

Referring to the table of FIG. 3, the content in the same column as the cell marked '0' is transmitted to the device in the same row as the cell marked by the same '0'. Accordingly, the digital book (text content i) is transmitted to the electronic book 220, the music (audio content ii) is transmitted to the MP3 player 230, and the image (video content iii) is transmitted to the PVR 240.

The table of FIG. 3 is constructed on the principle that the content is transmitted to a device with the highest priority to play back the content purchased by the user. The 'device with the highest priority' herein refers to a device which is operated mainly to play back the corresponding content.

Determining a device with the highest priority to play back the content may be carried out based on the device name, product number or serial number, as these may represent the main function of the device.

Accordingly, referring to the table of FIG. 3, the digital book (i) is transmitted to the electronic book 220 which is operated mainly to play back text content, the music (ii) is transmitted to the MP3 player 230 which is operated mainly to play back audio content, and the image (iii) is transmitted to the PVR 240 which is operated mainly to play back video content.

Furthermore, although not illustrated, additional information may be added to the table so that, for example, the text content is transmitted to a printer (not illustrated), and widget content including weather or stock trading is transmitted to a refrigerator (not illustrated).

Meanwhile, the CP server 100 refers to the IP addresses stored in the table of FIG. 3 when transmitting the content to the corresponding device, as is also applicable to other tables which will be explained below.

The file format of the content is one of content attributes, and differs depending on each type of the content. Also, even the content of the same kind may have different file format.

For example, the audio content (i) includes MP2 file, Ogg file, WMA file, WAV file, or ACC file, the motion image content (ii) includes WMV file, MPEG file, or H.264 file, and still image content (iii) includes JPG file, BMP file or TIF file as the file format.

For convenience in understanding and explaining the embodiments of the present invention, it is assumed that, i) the text content includes "B1", "B2" and "B3" file format, ii) the audio content includes "A1", "A2" and "A3" file format, and iii) the video content includes "V1", "V2" and "V3" file format.

FIG. 4 illustrates a table of principles to consider when determining a device to transmit content to based on the file format of the content. The table of FIG. 4 is stored in the CP server 100, and referred to when S340 of FIG. 2 is performed. Meanwhile, although only the CP server 100 stores the table of FIG. 4 as an example, the embodiment of the present invention is not limited thereto. Accordingly, the DECE server 140, the cloud server 150, or other devices connected communicatively to the CP server 100 or the cloud server 150 may store the table of FIG. 4.

The table of FIG. 4 lists file formats playable by the devices according to the content types. To be specific, i) the electronic book 220 is capable of playing back digital books (text content) in "B1" and "B2" formats, music (audio content) in "A1" format, and image (video content) in "V1" format, ii) the MP3 player 230 is capable of playing back digital book (text content) in "B3" format, music (audio content) in "A2" format, and image (video content) in "V1" format, iii) the mobile phone 210 is capable of playing back digital book (text content) in "B1" format, music (audio content) in "A3" format, and image (video content) in "V3" format, and iv) the PVR 240 is capable of playing back digital book (text content) in "B2" format, music (audio content) in "A2" format, and image (video content) in "V2" format.

Meanwhile, some of the file formats are in circles as shown in the table of FIG. 4, and this is to indicate a specific device to which the content in the circled file formats is transmitted.

The content in the circled file formats is transmitted to the device in the same row as the cells where the circled file formats are indicated. To be specific, i) the digital book (text content) in "B1" and "B2" formats is transmitted to the electronic book 220, ii) the digital book (text content) in "B3" format, and the music (audio content) in "A1" and "A2" formats is transmitted to the MP3 player 230, iii) the music (audio content) in "A3" format and the image (video content) in "V3" format is transmitted to the mobile phone 210, and iv) the image (video content) in "V1" and "V2" formats is transmitted to the PVR 240.

The table of FIG. 4 is constructed on the main principle that the content is transmitted to a device with the highest priority to play back the content purchased by the user, with a condition that the device with the second highest priority is to replace the device with the highest priority if it is impossible to meet the main principle.

For example, the main purpose may be to transmit a digital book (text content) to the electronic book 220, but since the digital book (text content) in "B3" format cannot be played back on the electronic book 220, this content in "B3" format is transmitted to the MP3 player 230 where the content can be played.

Furthermore, the main purpose may be to transmit music (audio content) to the MP3 player 230, but since the music (audio content) in "A3" format cannot be played back on the MP3 player 230, this content in "A3" format is transmitted to the mobile phone 210 where the content can be played.

Likewise, the main purpose may be to transmit the image (video content) to the PVR 240, but since the image (video content) in "V3" format cannot be played back on the PVR 240, this content in "V3" format is transmitted to the mobile phone 210 where the content can be played back.

With respect to video content, even the same content may have video files of two or more different resolutions. For example, the same video content may exist in HD image file and mobile image file. The HD image file, which has the relatively high resolution, is suitable for playing back on a TV which has a larger display size. On the contrary, the mobile image file, which has relatively low resolution, is more suitable for playing back on a mobile device which has a smaller display size.

The principles of determining a device to transmit content to based on the resolution of the content are listed in the table of FIG. 5. The table of FIG. 5 is stored in the CP server 100 and referred to when step S340 of FIG. 2 is performed. Meanwhile, although only the CP server 100 stores the table of FIG. 5 for illustrative purpose, the DECE server 140, the cloud server 150, or other devices communicatively connected to the CP server 100 or the cloud server 150 may also store the table of FIG. 5.

According to the table of FIG. 5, the mobile image (i) is transmitted to the mobile phone 210 with relatively smaller display size, and the HD image (ii) is transmitted to the PVR 240 which outputs the image through a TV with the relatively larger display size.

The table of FIG. 5 is constructed on a principle that the content is transmitted to a device which outputs image through a display with highest priority to play back the content purchased by the user.

The table of FIG. 6 is constructed on a main principle that the content is transmitted to a device with the highest priority to play back the content purchased by the user, with a condition that the device with the second highest priority is to replace the device with the highest priority if it is impossible to meet the main principle.

The table of FIG. 6 lists the categories of device types according to their priority orders based on the suitability to play back the content. Accordingly, the content is transmitted to the devices according to the priority orders as indicated in FIG. 6.

For example, the digital book (text content) is transmitted in the order of "electronic book 220→MP3 player 230→mobile phone 210→PVR 240".

Specifically, the digital book (text content) is transmitted to the electronic book 220, but under circumstances that the electronic book 220 is not able to receive the digital book (text content) due to, for example, lacking memory space, or poor communicational status with the electronic book 220, the digital book (text content) is transmitted to the MP3 player 230.

If the MP3 player 230 is not able to receive the digital book (text content), the digital book (text content) is transmitted to the mobile phone 210, and if the mobile phone 210 is not able to receive the digital book (text content), the digital book (text content) is transmitted to the PVR 240.

According to the table of FIG. 6, the music (audio content) is transmitted in the order of "MP3 player 230→mobile phone 210→electronic book 220→PVR 240", and the image (video content) is transmitted in the order of "PVR 240→mobile phone 210→MP3 player 230→electronic book 220".

The tables explained above, which list the principles for determining a device to transmit content to, may be written by one of the servers and devices illustrated in FIG. 1. The devices listed in the tables are owned by the users.

If the mobile phone 210, the electronic book 220, the MP3 player 230 or the PVR 240 construct a table, the device that constructs the table collects information about the devices owned by the user and transmit the constructed table to the CP server 100, the DECE server 140 or the cloud server 150. Meanwhile, the device that constructs the table, may transmit the constructed table to the cloud browser (not illustrated) connected to the cloud server 150.

Furthermore, the table constructed by the mobile phone 210, the electronic book 220, the MP3 player 230 or the PVR 240 may be transmitted to the CP server 100, the DECE server 140 or the cloud server 150 outside, via home gateway.

Meanwhile, collecting the information may be performed by the user who manually inputs the information, or alternatively, the information may be collected automatically from the devices, by setting a connection via the AP 30.

If the CP server 100 constructs a table, it is required to provide the CP server 100 with the information about the devices owned by the user. Providing the information may be implemented in a manner in which the user accesses the CP server 100 and provides the information about his devices by manual inputting. The table constructed by the CP server 100 may be provided to the cloud server 150. The CP server 100 only provides the cloud server 150 the content requested for purchase. Therefore, the CP server 100 does not determine at least one device from among a plurality of devices to transmit the content to. However, the cloud server 150 may determine devices to transmit the content to from among the plurality of devices, based on the attributes of the requested content and referring to the table provided by the CP server 100.

Furthermore, if another server, which stores information about the devices owned by the user, transmits such information to the CP server 100, the CP server 100 may construct a table using the received information. Again, the table constructed on the CP server 100 may be provided to the DECE server 140 or the cloud server 150.

Since the DECE server 140 and the cloud server 150 are explained above, the detailed explanation about these servers 140, 150 will be omitted in the following description, while the constitution of the CP server 100 will be particularly explained hereinafter.

Figure 7:
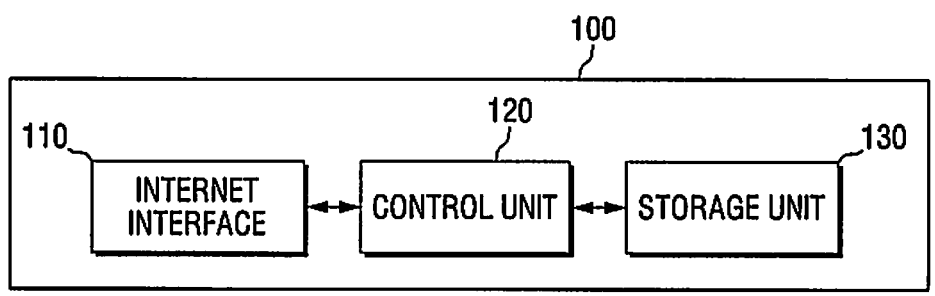
FIG. 7 is a detailed block diagram of the CP server of FIG. 1.

FIG. 7 is a detailed block diagram of the CP server 100 of FIG. 1. As illustrated in FIG. 7, the CP server 100 may include an Internet interface 110, a control unit 120, and a storage unit 130.

The Internet interface 110 accesses the Internet and sets up a connection for communication among the CP server 100 and the DECE server 140, the cloud server 150, the mobile phone 210, the electronic book 220, the MP3 player 230 and the PVR 240.3

The storage unit 130 provides a storage space where the content for purchase is stored and another storage space where the tables explained above are stored.

From among the operations of FIG. 2, the control unit 120 performs the operations of the CP server 100. Specifically, the control unit 120 generates an authentication key and transmits the generated authentication key to the mobile phone 210, if a request for content purchase is received through the Internet interface 110.

Furthermore, the control unit 120 requests the DECE server 140 for information of an authenticated device which is capable of playing back the content requested for purchase to the CP server 100 via the Internet interface 110, and the CP server 100 receives the information of the authenticated device which is capable of playing back the content requested for purchase via the Internet interface 110.

Furthermore, referring to the table stored on the storage unit 130, the control unit 120 determines one of the devices owned by the user to transmit the requested content to. Accordingly, the control unit 120 transmits the requested content, stored on the storage unit 130, to the corresponding device via the Internet interface 110.

Figure 8:
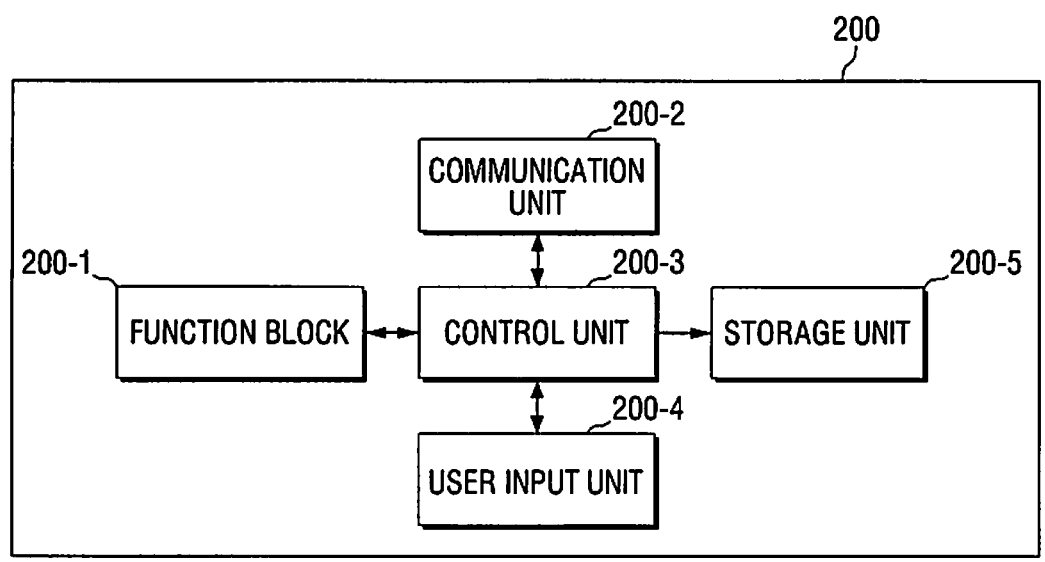
FIG. 8 is a block diagram of an electronic device such as a mobile phone, an electronic book, a MP3 player and a Personal Video Recorder (PVR).

FIG. 8 is a block diagram of an electronic device 200, which represents the mobile phone 210, the electronic book 220, the MP3 player 230 and the PVR 240.

The electronic device 200 may include a function block 200-1, a communication unit 200-2, a control unit 200-3, a user input unit 200-4, and a storage unit 200-5.

The function block 200-1 performs the main function as the electronic device 200. For example, i) if the electronic device 200 is the mobile phone 210, the function block 200-1 performs phone calling, SMS function or content storing/playing back, and ii) if the electronic device 200 is the electronic book 220, the function block 200-1 performs storing/playing back of the content (particularly, text content), iii) if the electronic device 200 is the MP3 player 230, the function block 200-1 performs storing/playing back content (particularly, audio content), and iv) if the electronic device 200 is the PVR 240, the function block 200-1 performs storing/playing back of the content (particularly, image content).

The communication unit 200-2 is connected to the AP 30 for wireless communication, and inevitably, connected communicatively to the CP server 100, the DECE server 140 or the cloud server 150 via the Internet 10.

The control unit 200-3 controls the operation of the electronic device 200 according to a user command inputted to the user input unit 200-4. To be specific, the control unit 200-3 may transmit a request for content purchase to the CP server 100 via the communication unit 200-2, and stores the content received from the CP server 100 via the communication unit 200-2 on the storage unit 200-5.

The control unit 200-3 also controls the function block 200-1 to play back the content selected by the user through the input unit 200-4 from among the content stored on the storage unit 200-5. Additionally, the control unit 200-3 may construct a table regarding the devices owned by the user and transmit the constructed table to the CP server 100, the DECE server 140 or the cloud server 150 via the communication unit 200-2.

The network is illustrated in FIG. 1 as an example. Accordingly, other types of electronic devices may replace the devices illustrated in FIG. 1 according to an embodiment of the present invention.

Although an embodiment of the present invention is explained with reference to an example where the user requests purchase of content through the electronic book 220, this is merely for illustrative purposes. Accordingly, devices other than electronic book 220 may also be utilized to request purchase of content according to the technical concept of the present invention.

The technical concept of the present invention is also equally applicable to an example where the content is requested for reasons other than purchase.

While the content type, file format or resolution are mentioned above as the examples of the attributes of the content, the present invention is not limited to these examples only. Accordingly, it is possible to determine a device to transmit content to, based on other content attributes.

If there is no device from among the devices owned by the user which is capable of playing back the content requested by the user, the CP server 100 informs this to the user so that the user determines to stop or cancel the purchase.

For example, the above is applicable to when the user does not have a device which is capable of playing back the file format of the content that he intends to purchase.

Although the CP server 100 determines a device to transmit content to and transmit the content to the determined device in the embodiment explained above, this is only for illustrative purposes. Accordingly, in another implementation, the CP server 100 may transmit the content to a home server (not illustrated) which is communicatively connected to the devices.

In the above-mentioned case, the home server may distribute the content in a manner of determining a device to transmit the content to based on the attributes of the content to be transmitted from the CP server 100, and transmitting the content to the determined device.

Meanwhile, the home server may automatically collect the information from the devices for the purpose of content distribution. That is, the home server may receive metadata from the devices and collect information about the devices through device ID, device profile (display resolution, display color range, display size, or playable file format) written in the metadata received from the devices.

The content distributed by the home server may not be the content transmitted from the CP server 100. That is, the home server may distribute the content acquired from other sources, or content already owned therein to the devices. This manner of content distribution may particularly be effective when applied to the Digital Living Network Alliance (DLNA)-based network.

While the invention has been shown and described with reference to certain embodiments thereof, it will be understood by those skilled in the art that various changes in form and detail may be made therein without departing from the spirit and scope of the invention, as defined by the appended claims.

What is claimed is:

1. A method for providing content by a server, the method comprising:
   receiving a request for content;
   receiving information of a plurality of devices which communicate with the server, the information being related to a type of content which is able to be played back in each of the plurality of devices;
   determining one from among the plurality of devices that has highest priority among the plurality of devices as the device to play back the content, based on the information; and
   transmitting the content to the device which is determined as the device to play back the content,
   wherein determining the device to play back the content comprises, if the device with the highest priority is not able to receive the content, determining the device with the second highest priority as the device to play back the content, based on the information.

2. The method of claim 1, further comprising transmitting the content to the device which is determined as the device to play back the content.

3. The method of claim 1, wherein the information comprises a type of the content, and the priority is determined according to the type of the content.

4. The method of claim 3, wherein the type of the requested content comprises at least one of text content, audio content, and video content, and the determining comprises, from among the plurality of devices,
   i) if the content is the text content, determining a device whose main function is to play back the text content as the device to transmit the content to,
   ii) if the content is the audio content, determining a device whose main function is to play back the audio content as the device to transmit the content to, and
   iii) if the content is the video content, determining a device whose main function is to play back the video content as the device to transmit the content to.

5. The method of claim 3, wherein determining the device to transmit the content to comprises determining a device, which is capable of outputting the content to a display suitable for the resolution of the content, as the device to play back the content.

6. The method of claim 1, wherein the device to play back the content is determined based on a table in which devices to transmit the content to are set in advance based on the type of the content.

7. The method of claim 6, wherein the table is constructed by at least one of a server to provide the information of the authenticated device, a server to provide the content, and a device connected communicatively to the server.

8. The method of claim 1, wherein the plurality of devices corresponding to the information of the authenticated device comprises of devices owned by a user.

9. The method of claim 1, wherein receiving the request for content comprises receiving a request for purchase of the content.

10. The method of claim 1, further comprising transmitting an authentication key to the device requesting the content and to other devices,
    wherein determining the device to play back the content is performed if the authentication key, provided at the transmitting, is received from the device requesting the content.

11. A method for purchasing content in at least one of a plurality of content playback devices, the method comprising:
    receiving content requested for purchase from the at least one of the plurality of content playback devices; and
    playing back the received content,
    wherein the received content is determined to be playable in one of the at least one content playback devices that has highest priority among the at least one content playback devices based on information related to a type of content that is able to be played back in each of the plurality of content playback devices, and the content is transmitted to the device which is determined as the device to play back the content, and
    wherein determining the received content to be playable in one of the at least one content playback devices comprises, if the device with the highest priority is not able to receive the content, determining the device with the second highest priority as the device to play back the content, based on the information.

12. The method of claim 11, wherein receiving the content comprises receiving the requested content from a server,
    wherein the server, when the received content is determined to be playable in the at least one of the content playback devices based on the information, transmits the requested content to the at least one content playback device.

13. The method of claim 11, wherein the information comprises a type of the requested content.

* * * * *